United States Patent Office 3,705,881
Patented Dec. 12, 1972

3,705,881
CATALYSIS OF POLYAMIDE FORMATION
Steven Edward Schonfeld, Akron, Ohio, assignor to The Firestone Tire & Rubber Company, Akron, Ohio
No Drawing. Filed Jan. 21, 1969, Ser. No. 792,780
Int. Cl. C08g 20/10
U.S. Cl. 260—78 L        3 Claims

ABSTRACT OF THE DISCLOSURE

There has been provided a method of catalyzing polyamide formation in which the catalyst is a mixture of acids of phosphorus and sulfur.

---

The present invention relates as indicated to a catalyst system for the production of polyamides, and more particularly to a synergistic acid catalyst system of the binary type.

In the production of relatively high molecular weight polyamides, the achievement of molecular weight stability to heat of the resulting polyamide has been a problem which has heretofore caused considerable difficulty. In order to achieve molecular weight stability either in terms of increase in molecular weight upon standing during the interim between manufacture of the polymer and actual spinning into fibers, it is necessary to utilize an end-blocking material such as an amine or an acid. The presence of such end-blocking agents, particularly in the quantities necessary to achieve the desired molecular weight stability, inhibits the attainment of desired molecular weight in a predetermined period of time. Consequently, it is desired to find a catalytic system which will allow the use of sufficient quantities of end-blocking material to achieve molecular weight stability and at the same time permit the attainment of a desired molecular weight, for example, spinning into fibers, in a relatively shorter period of time. The system utilizing acids of phosphorus and sulfur is capable of producing this desired effect.

Acid catalysts, as such, have heretofore been used in hydrolytic polymerization procedures for the production of linear polyamides. However, these systems have depended upon the utilization of a single catalytic material. The present invention depends upon the use of a combination of catalytic materials, and particularly those characterized by the presence therein of phosphorus and sulfur.

Reference may be had to U.S. Pats. 2,557,808 and 2,993,879, each of which teaches the use of phosphoric acid as a catalytic agent in the production of linear polyamides. The teachings of the present invention may be applied to the procedures of the aforesaid prior U.S. patents, and accordingly, the teachings of those patents with respect to the polymerization procedures involving teachings of the use of catalysts are incorporated herein by reference thereto. The present invention provides a method of utilizing a new catalytic composition for polyamide formation characterized by the presence therein of phosphorus and sulfur-containing materials.

BRIEF STATEMENT OF THE INVENTION

Briefly stated, therefore, the present invention is in a method of catalyzing the polymerization of polyamide-forming material which comprises the steps of adding to and dispersing in a polymerizable mass of polyamide-forming material a catalytic amount of a mixture which consists of an acid of phosphorus and an acid of sulfur, followed by heating the resultant mass at a temperature and for a period of time sufficient to form a polyamide.

The conditions of polyamide formation themselves are not essentially different from those heretofore practiced, as for example in the aforesaid patents, the essence of the present invention being in the utilization of a new catalytic material not heretofore utilized and which is productive of polyamide compositions having desired molecular weights at an improved reaction rate and also exhibiting higher molecular weight stability upon standing and exposure to heat.

DETAILED DESCRIPTION OF INVENTION

As indicated above, the present invention is in the catalysis of polymerization of polyamide-forming reaction masses. These masses include bodies of prepolymerized reactants or monomeric reactants, or mixtures thereof.

Linear polyamides are well known polyamide-forming materials heretofore known and used. Thus, lactams and salts formed from various diamine or polyamine materials and polycarboxylic acids may be used. The polyamine and polycarboxylic acid reaction product results from substantially equal molar amounts of the polyamine and the polycarboxylic acid.

The reaction masses may, as indicated above, contain an end-capping material which is reactive with the resultant polyamide. These materials tend to limit the rate of elevation of the molecular weight of the polyamide, but when the catalytic agent is in accordance with the present invention, this difficulty is greatly reduced.

Accordingly, among the lactams which are useful in the practice of the present invention are any of those which have previously been used, and especially the lactams of omega-amino carboxylic acids which contain from 5 to 12 carbon atoms, e.g. caprolactam, caprylolactam, laurolactam, omega-amino undecanoic acid lactam, etc. Also, the polyamide-forming material may comprise amides formed from substantially equimolar amounts of an organic $C_2$–$C_8$ alkylene polyamine such as ethylene diamine, propylene diamine, tetramethylene diamine, hexamethylene diamine, octamethylene diamine, etc.; and a $C_4$–$C_{12}$ dicarboxylic acid such as sebacic, adipic, pimelic, azelaic, etc.

End-capping, where this is desired, may be achieved by the utilization of low molecular weight aliphatic monocarboxylic acids such as acetic acid, phenyl acetic acid, etc., or relatively low molecular weight alkyl monoamines such as ethylamine, propylamine, butylamine, cyclohexylamine, and the like.

These materials are used in an amount sufficient to cause end-blocking of the polymer chains and to promote molecular weight stability. The manner of using such materials and the amount in which they are used are well known to those skilled in the art and need not be further delineated here.

As indicated above, the present invention is primarily in the catalytic material and its use in catalyzing the polymerization reaction to the formation of the polyamide materials, particularly in hydrolytic polymerization systems. Any acid anhydride or acid formed therefrom, or aqueous solution thereof, which material is characterized by the presence of an acid of phosphorus and an acid of sulfur, may be used to achieve the advantages of the present invention.

For most purposes, aqueous solutions of phosphoric acid and sulfuric acid are used to form the catalytic systems of the present invention. Best results are achieved when the relative concentrations of the acid of phosphorus with respect to the acid of sulfur are in excess, although the relative proportions of the acid of phosphorus to the acid of sulfur may be in the range of from 99:1 to 1:99.

It becomes convenient at this point to illustrate the present invention by giving specific examples showing the manner in which the catalytic agents of the present invention are employed.

EXAMPLE 1

This example illustrates the catalysis of the polymerization of caprolactam to produce a linear nylon-6 utilizing a mixed catalyst of phosphoric acid and sulfuric acid.

A vessel was charged with the following ingredients in the indicated amounts:

| | |
|---|---|
| Caprolactam parts | 300 |
| Water do | 3 |
| n-Butylamine do | 1.05 |
| Acetic acid do | 0.865 |
| Phosphoric acid (85% aqueous solution) parts/million | 25 |
| Sulfuric acid (98% aqueous solution) do | 25 |

An inert atmosphere of nitrogen is supplied, and the vessel closed. The mixture is heated to a temperature above the melting point of the polyamide but below that at which rapid degradation of the polyamide takes place. In the present case, the prepolymer is formed at a temperature of from 220° to 300° C. The usual heating period is from at least 3 hours to 20 hours under these conditions, and in the present sample 16 hours are utilized. Thereafter, the polymer is further polymerized for a period of time up to 6 hours at a temperature of 260° C. under a vacuum of 100 microns of mercury. Relative viscosity is determined in a 1% solution of the polyamide in 96% sulfuric acid at 25° C.

In order to determine the effect of vacuum polymerization, unaged portions of the foregoing example are further polymerized for periods of 1, 2, 4 and 6 hours, respectively, and the relative viscosities noted for each. The following table shows the results and compares them with an unaged sample:

| Sample number | Hours of vacuum polymerization time | Relative viscosity |
|---|---|---|
| 1 | 0 | 1.90 |
| 2 | 1 | 2.59 |
| 3 | 2 | 2.60 |
| 4 | 4 | 2.71 |
| 5 | 6 | 2.90 |

To demonstrate the effect of the catalyst system at various polymerization times, the following table shows the results obtained with a basic recipe and procedure in accordance with Example 1, the only variants being the catalyst system and the polymerization time.

| | Relative viscosity | | | |
|---|---|---|---|---|
| Vacuum polymerization time, hours | No catalyst | 25 p.p.m. $H_3PO_4$, 25 p.p.m. $H_2SO_4$ | 50 p.p.m. $H_2SO_4$, 0 p.p.m. $H_3PO_4$ | 50 p.p.m. $H_3PO_4$, 0 p.p.m. $H_2SO_4$ |
| 0 | 1.76 | 1.90 | | 1.96 |
| 1 | 2.05 | 2.59 | | 2.32 |
| 2 | 2.13 | 2.60 | 2.56 | 2.45 |
| 4 | 2.34 | 2.71 | | 2.56 |
| 6 | 2.48 | 2.90 | 2.24 | 2.67 |

The foregoing table shows that in the absence of any catalyst, or in the presence of a catalyst system consisting of sulfuric acid, or phosphoric acid alone, the attainment of relative viscosity, which is a measure of molecular weight, is in all cases of aged samples lower than in the case of a catalyst sytem which is a mixture of the two acidic materials. Stated in another way, the rate at which the mixed acid catalyzed samples reach a predetermined relative viscosity is greater than the rates observed in the cases of no catalyst, or catlaysts which consist of the respective acids alone.

EXAMPLE 2

The procedure and recipe of Example 1 is repeated with the exception that the catalyst is composed of 5 p.p.m. of benzene disulfonic acid and 45 p.p.m. of 85% aqueous phosphoric acid. In the same manner as Example 1, relative viscosities were measured after polymerization times as indicated below:

| Sample number | Hours of polymerization time | Relative viscosity |
|---|---|---|
| 1 | 0 | 1.93 |
| 2 | 1 | 2.46 |
| 3 | 2 | 2.63 |
| 4 | 4 | 2.66 |
| 5 | 6 | 2.85 |

EXAMPLE 3

Highly end-capped nylon-6 samples are prepared by a hydrolytic polymerization process similar to that described in U.S. Pat. 2,557,808. These polymers are bottle polymerized for 16 hours at 260° C. under a nitrogen atmosphere. The resultant polymer is chopped in a Wiley mill. Then 20-gram samples are placed in 8-inch test tubes and further polymerized at 100 microns of mercury at 260° C. for 2 and 6 hours, respectively. The samples are prepared with various catalyst concentrations as indicated below. The relative viscosities are determined as in Example 1 as 1% solutions of the polymer in concentrated 96% sulfuric acid at 25° C.

The following table sets forth the results secured in the comparative tests outlined above:

| Catalyst system, p.p.m. | | Relative viscosity (hours of vacuum) | |
|---|---|---|---|
| Phosphoric acid | Sulfuric acid | 2 | 6 |
| 0 | 0 | 2.13 | 2.48 |
| 50 | 0 | 2.45 | 2.67 |
| 45 | 5 | 2.64 | 3.00 |
| 40 | 10 | 2.64 | 2.92 |
| 35 | 15 | 2.62 | 2.90 |
| 25 | 25 | 2.60 | 2.90 |
| 0 | 50 | 2.56 | 2.24 |

It has been found that comparable catalytic activities are realized when strong sulfur-containing organic acids are employed along with phosphoric acid. Such sulfur acids are the sulfonic acids such as toluene sulfonic acid, bezene sulfonic acid, and the like.

There has therefore been provided a new catalytic system for catalysis of polyamide formation, which catalytic system is composed of an acid of phosphorus and an acid of sulfur in admixture and utilized in a catalytic amount to promote the rate of formation of polyamides of a desired molecular weight and having satisfactory molecular weight stability. Materials prepared in the foregoing manner show extreme stability over long periods of time when the materials are exposed to molecular weight altering conditions normally encountered by polyamides, e.g. molten storage before spinning, and thereafter tested for retention of relative viscosity in the manner previously indicated.

What is claimed is:

1. A method of catalyzing the polymerization of a $C_5$ to $C_{12}$ omega-lactam which comprises the steps of adding to and dispersing in a polymerizable mass of such lactam from 0.001% to 0.01% by weight of a mixture of an acid of phosphorus or an anhydride thereof and an acid of sulfur or an anhydride thereof, said phosphorus acid or anhydride being selected from the group consisting of orthophosphoric acid and its anhydride, and said acid of sulfur or anhydride thereof being selected from the group consisting of sulfuric acid, toluene sulfonic acid, benzene sulfonic acid and benzene disulfonic acid and their anhydrides, and heating the resultant mass at a temperature above the melting point of the fiber forming high molecular weight polyamide being formed but below that at which rapid degradation of said polyamide takes place and for a period of time sufficient to form said polyamide.

2. A process in accordance with claim 1, in which the polyamide-forming material is a $C_5$ to $C_{12}$ lactam.

3. A process in accordance with claim 1 in which the polyamide-forming material is caprolactam and the catalyst is a 45:5 mixture of phosphoric acid and sulfuric acid, respectively.

References Cited
UNITED STATES PATENTS

| | | | |
|---|---|---|---|
| 2,241,321 | 5/1941 | Schlack | 260—78 |
| 3,027,356 | 3/1962 | Von Schiekh et al. | 260—78 |
| 3,321,447 | 5/1967 | Kunde et al. | 260—78 |
| 3,501,442 | 3/1970 | Burrows et al. | 260—78 |

HAROLD D. ANDERSON, Primary Examiner

U.S. Cl. X.R.

260—78 R